United States Patent [19]

Smithline

[11] 4,092,070
[45] May 30, 1978

[54] TUNING OF ETALONS IN SPECTROSCOPIC APPARATUS

[75] Inventor: Leonard M. Smithline, Ithaca, N.Y.

[73] Assignee: Lansing Research Corporation, Ithaca, N.Y.

[21] Appl. No.: 735,586

[22] Filed: Oct. 26, 1976

[51] Int. Cl.² .............................................. G01B 9/02
[52] U.S. Cl. .............................. 356/106 S; 250/204; 356/112
[58] Field of Search .................... 356/106 S, 110, 112, 356/152; 250/204

[56] References Cited

U.S. PATENT DOCUMENTS 3,914,055 10/1975 Wolga et al. .................. 356/106 S Primary Examiner—Vincent P. McGraw
Attorney, Agent, or Firm—Theodore B. Roessel; J. Stephen Yeo

[57] ABSTRACT

Light passing through an etalon is divided into three beams, each beam being incident to the etalon at a different angle. Two of the beams are received by detectors which generates intensity representative signal for each beam. The difference between the beam intensities represents the error between the etalon's passband and the wavenumber of the received light.

4 Claims, 2 Drawing Figures

OUTPUT SIGNAL AT 42

TUNING OF ETALONS IN SPECTROSCOPIC APPARATUS

RELATED PATENTS

U.S. Pat. No. 3,914,055 by Wolga et al for "Instrument for High Resolution Spectral Analysis with Large Optical Throughput", Issued Oct. 21, 1975 is incorporated by reference.

BACKGROUND OF THE INVENTION

The invention relates to instruments for spectral analysis, and particularly to instruments have a tunable etalon as an optical element.

In spectral analysis it is sometimes necessary to align one of the passbands of an etalon with the quasi monochromatic output of another element. For example, in the above identified Wolga patent a tunable acoustic optical filter is used in series with an etalon. It is necessary to align one passband of the etalon with the passband of the acoustic-optic filter.

The cited Wolga device achieve frequency alignment and lock by dithering one of the optical elements. The misalignment of the combination is sensed by sending white light through the filter and carrying out phase-sensitive detection of the variation in total transmitted light intensity as one element is dithered.

The object of the present invention is to provide an improved instrument operating on a DC principle which eliminates the need for dithering. One benefical result is simplication of the electronics required to support the instrument.

SUMMARY OF THE INVENTION

A tunable acoustic optic filter and a collimator provide a collimated quasi-monochromatic light beam. A pair of prisms, or other light deviating means, divides the beam into three fractions, each of which passes through an etalon at a different angle, which affects the intensity of the beams. Detectors generate signals representing the intensities of the two fractions deflected by the prisms. A difference amplifier, or the like, generates a difference signal representing the difference between detector signals. The difference signal is an error signal indicating the amount the etalon is detuned from the quasi-monochromatic beam.

DETAILED DESCRIPTION OF THE DRAWINGS

Figure 1:
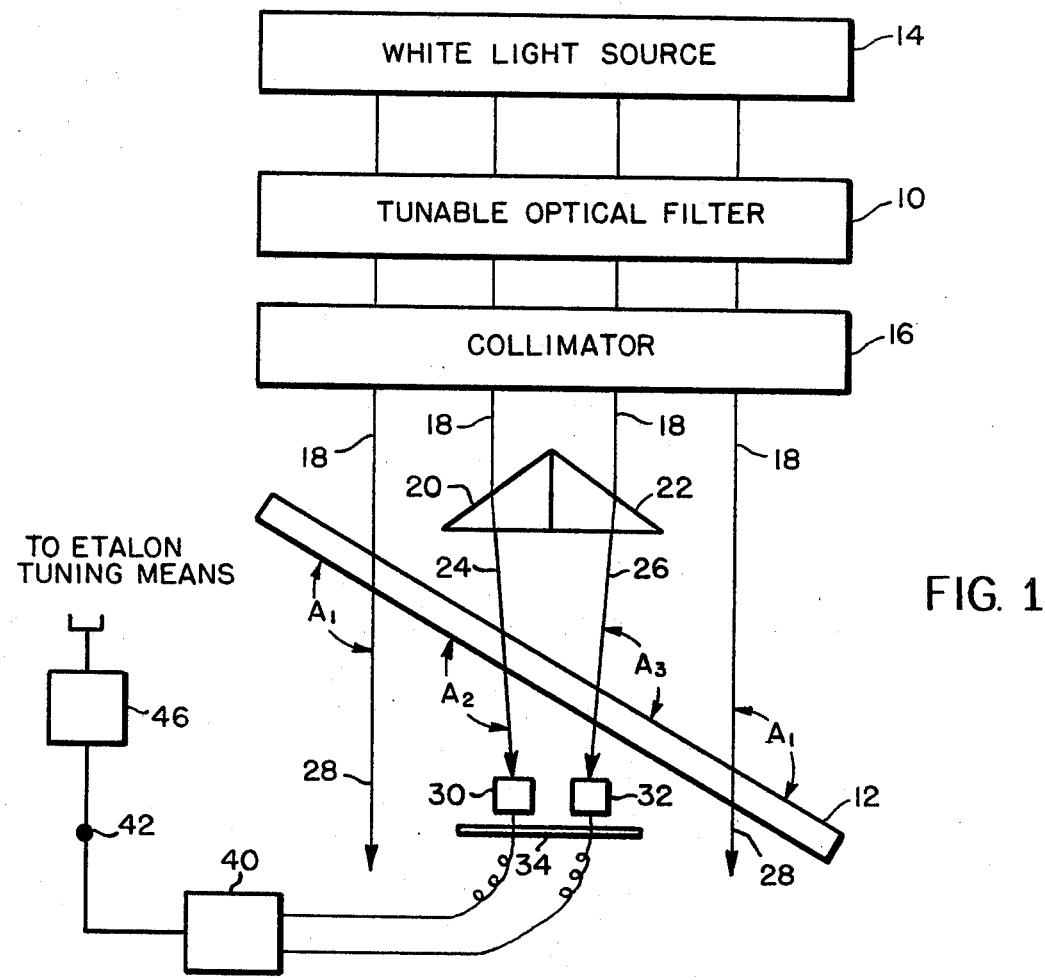
FIG. 1 shows a preferred embodiment of the invention.

The preferred embodiment of the invention is shown in FIG. 1. As a spectroscopic analyzer, a tunable optical filter 10 is used in series with an etalon 12. During tuning a white light source 14 provides the input is the filter 10. The tunable optical filter 10 is varied in steps to pass quasi-monochromatic light in a band having a peak wavenumber $\eta_o$. The etalon is used to increase the resolution obtained by the acoustic optic filter 10. Hence the need to tune the etalon 12 to the same wavenumber as the filter 10.

This arrangement was first disclosed in the cited U.S. Pat. No. 3,914,055. In the present invention a collimator 16 is interposed between the filter 10 and the etalon 12.

The collimator 16 collimates the light beam issuing from the filter 10, thereby yielding a collimated quasi-monochomatic beam 18.

Etalon 12 is in the optical path of the collimated quasi-monochomatic light beam 18. The beam 18, to the extent not deviated, is incident to the etalon at an angle $A_1$. A pair of refracting prisms 20, 22 are located within the light beam 18 so as to deviate two fractions 24, 26 of the light beam 18. A first fraction 28 of the beam is not deviated and so is incident at $A_1$. The second and third fractions 24, 26 are incident to the etalon 12 at angles $A_2$ and $A_3$, where $A_2$ is greater than $A_1$ and $A_3$ is less than $A_1$.

The prisms 20, 22 preferably are identical but mounted in opposite sense. Etalons are usually constructed of a pair of separated parallel plates, the inner surfaces of which are coated so as to be partly reflective. Light incident to the etalon will be reflected between the plates and at certain wavenumbers will be transmitted through the etalon. The etalon may be considered an optical comb filter having a plurality of passbands. Individual passbands are identified as being a particular order.

The center wavenumber of a passband of order "n" is dependent upon the spacing between the reflecting surfaces of the etalon, and the incident angle of light received by the etalon.

As a feature of the invention, the three fractions 24, 26, 28 of a light beam are incident to an etalon at three different angles $A_1$, $A_2$ and $A_3$. Corresponding passbands along each angle are centered at a different wavenumber.

Photo detectors 30, 32 receive the two deviated fractions 24, 26 of the light beam after transmission through the etalon. Light 24, 26 may reach the detectors by mirrors (not shown) located behind the etalon or by locating the detectors behind the etalon as shown. A light shield 34 may be used to prevent any deviated light from continuing through subsequent optics such as the photo-multiplier tube described in the 3,914,055 patent.

Figure 2:
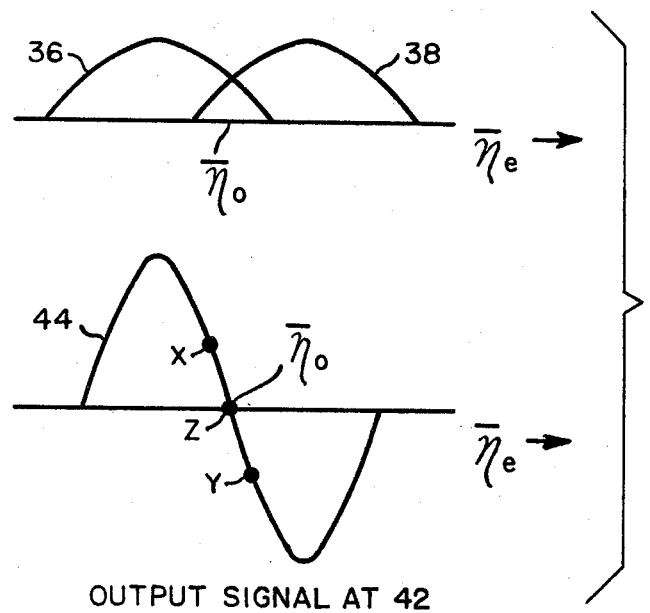
FIG. 2 portrays signals present in the embodiment shown in FIG. 1.

Two signals are generated by the detectors 30, 32, each signal representative of intensity of one of the transmitted deviated fractions 24, 26. The two detector signals 36, 38 are shown in FIG. 2 as a function of intensity verses wavenumber.

The difference of the two signals 36, 38 may be obtained by means of circuitry, such as a differential amplifier 40. The difference amplifier has an output 42 at which appears a difference signal 44 as shown in FIG. 2. The difference signal 44 may be used to tune the etalon so that the wavelength $\eta_e$ at the center passband corresponding to the first fraction 28 concides with the peak wavenumber of the filtered light beam $\eta_o$. Assuming curve 38 is subtracted from curve 36, when $\eta_e$ is less than $\eta_o$ the detector and difference signals may be at point X. When $\eta_e$ is greater than $\eta_o$ the signals may be at point Y. The difference signal is a tuning error signal, the magnitude of which is representative of the misalignment between the center wavelengths of the etalon and the filter. The polarity or phase of the difference signal 44 gives information as the direction the etalon 12 should be tuned.

The difference signal 44 is directed to a circuit 46, such as a stable negative feedback circuit, used to tune the etalon. The etalon may be tuned in any of several means. For example, the etalon may be rotated, thereby changing the incident angle of the light beam, or the spacing between the parallel plates may be changed. In any case, when the difference signal is nulled, point Z, the etalon is tuned.

Analyzer misalignment detection according to the present invention offers performance improvements over an analyzer using dither methods. While dither techniques are successful, increases in speed and accuracy are provided by the instant invention. The analyzer may now remain in continuous lock avoiding feasible electronic drift. The techniques of the invention also allows the use of simplified circuitry, the detail of which are not considered part of the claimed invention.

Having described the invention, I claim:

1. The combination of an etalon and apparatus for generating a tuning error signal representative of the misalignment of the center of a passband of etalon from the peak wavenumber of a collimated quasi-monochromatic light beam, said etalon being arranged so that a first fraction of said light beam is incident to said etalon at a first angle; said apparatus comprising,
   a. beam deviating means for causing a second fraction of said light beam to be incident to said etalon at a second angle greater than the first angle, and for causing a third fraction of said light beam to be incident to said etalon at a third angle lesser than the first angle; and
   b. detection means responsive to said second and third fractions for generating an difference signal representative of the difference between the intensity of the second fraction of said light beam as transmitted through said etalon and the intensity of the third fraction of said light beam as transmitted through said etalon; whereby said difference signal is the desired tuning error signal.

2. The combination of claim 1 wherein:
said beam deviating means comprises two refracting prisms arranged in said collimated light beam; and
said detection means comprises two photodetectors arranged to separately intercept the second and third fractions of said light beam and adapted to generate two signals in response thereto, said signals representing the intensities of said two fractions, there being a difference amplifier connected to said photodetectors to receive said signals and having an output at which appears said difference signal.

3. In combination with a tunable optical filter passing a quasi-monochromatic light beam having a peak wavenumber, the apparatus comprised of:
a collimator for collimating said light beam;
an etalon arranged so that a first fraction of said collimated light beam is incident to said etalon at a first angle;
beam deviating means for causing a second fraction of said light beam to be incident to said etalon at a second angle greater than the first angle, and a third fraction of said light beam to be incident to said etalon at a third angle lesser than the first angle; and
detection means for generating a difference signal being representative of the difference between the intensity of the second fraction of said light beam as transmitted through said etalon and the intensity of the third fraction of said light beam as transmitted through said etalon; whereupon said difference signal is a tuning error signal representative of the offset of the center of a passband of said etalon from the peak wavenumber of said collimated substantially monochromatic light beam.

4. The combination of claim 3 wherein:
said beam deviating means are two refracting prisms arranged in said collimated light beam; and
said detection means are two photodetectors arranged to separately intercept the second and third fractions of said light beam and for generating two signals, a signal representing the intensity of each of said two fractions, and a difference amplifier connected to said photodetectors for receiving said signals, said difference amplifier having an output where appears said difference signal.

* * * * *